United States Patent Office 3,098,748
Patented July 23, 1963

3,098,748
WHIPPING AND POWDERED SHORTENING
COMPOSITIONS
Peter P. Noznick and Charles W. Tatter, both % Beatrice
Foods Co., 1526 S. State St., Chicago, Ill.
No Drawing. Filed Mar. 24, 1960, Ser. No. 17,273
24 Claims. (Cl. 99—118)

This invention relates to an improved edible whipping compound which will not break down upon prolonged whipping, e.g., after 14 to 15 minutes of whipping, and which does not need to be refrigerated following mixing and before being whipped. That is, the product of this invention whips up immediately and will remain stable in whipped form for several hours at room temperature and for longer times if the whipped product is refrigerated as in the usual mechanical refrigerator.

EXAMPLE 1

In preparing this improved product, about 47.5% of hydrogenated cottonseed oil, by weight of the finished dry mix, is mixed with about 2½% of a mixture of mono and di-glycerides by weight of the finished dry mix to enhance the whipping effect. To this mixture is added about 10% of glycerol lactomonopalmitate which is the principal whipping agent. There is also added about 30% cane sugar by weight of the finished product as a sweetener. About 10% sodium caseinate by weight of the finished product is added to increase the whipping effect.

The above mixture is added to water in amount to give a 55% solids content, and stirred therein, whereupon we pasteurized the fluid mix at 145° F. for 30 minutes. The pasteurized liquid mixture is now homogenized at 550 p.s.i. at the pasteurization temperature, and thereafter is spray-dried through a relatively large size orifice and a low pressure such as will give a powder having a particle size of about 125 microns. The powdered product is now packaged for sale as desired.

This powder is a very excellent whipping material, of good keeping qualities and useful to form a whipped body as desired in many food products, including custards, ice creams, puddings, toppings, etc., and also may be used as an instant ice cream base.

Additional sugar or flavors are sometimes included in the powder up to about 20% of the total weight of the mixture to give any desired sweetness or flavor.

EXAMPLE 2

This example was like Example 1 except that we used propylene glycol monostearate instead of the palmitate.

EXAMPLE 3

This example was like Example 1 except instead of the palmitate we used glycerol lacto oleate.

EXAMPLE 4

This example was like Examples 1, 2 and 3 except that we added about 1% of lecithin based on the weight of the finished product, as an emulsifier, the same being added to the mix prior to the pasteurization and subsequent steps.

EXAMPLE 5

In this example, we followed the previous examples but before pasteurization we added to the mix a small amount of a stabilizer to increase the stiffness of the whip and used about 0.5% by weight of the finished product of sodium alignate.

EXAMPLE 6

This example was the same as the previous ones except that we included about 0.04% potassium acid tartrate to stiffen the whip and add a tangy flavor.

Other hydrogenated fats may be employed such as soybean oil and, in fact, any bland edible oil with a wide range of melting points, e.g., from 72° F. to 130° F. If the melting point is too high, there is imparted an objectionable greasy characteristic. The melting point of the edible hydrogenated fat should thus be about 75° F. to 100° F. so as not to form a film on the pallet of the consumer.

About 40% to 75% of the oil is employed.

The mono- and di-glycerides are standard commercial products, composed of aout 40 to 42% mono-, and about 43 to 45% di-glycerides, with the remainder tri-glycerides. This product which increases the whipping effect is used in amount of about 0.0 to 10% by weight of the finished dry mix. In some cases, it may be omitted.

The principal whipping agents as described in the foregoing examples, namely the glycerol lacto monopalmitate, propylene glycol monostearate and glycerol lacto oleate, or mixtures of these agents, are used in amount of about 0.5 to 15% by weight of the finished dry mix.

Instead of cane sugar, beet sugar or any form of sucrose such as corn sugar or mixtures of these sweeteners are used. The sugar decreases the whipping effect and is used only in amount desired to sweeten. About 5 to 35% by weight of the finished dry mix is used, as higher amounts make the product difficult to dry. Other sweetening agents can be used if desired.

The lecithin is optional. It is employed as recited in Example 4 as an emulsifier, is a commercial lecithin, and is used in amount of about .25 to 1.5% of the finished dry mix.

Instead of sodium caseinate, soy protein or non-fat milk solids or skim milk is employed to increase the whipping effect. About 1 to 15% by weight of the finished dry mix is used.

The use of a stabilizer is optional, and in lieu of sodium alginate, carrageenin, gum tragacanth, gum acacia, gum karaya, and locust bean are employed. About .02 to 1.0% is used preferably about .2 to .5% of the weight of the finished dry mix. These stabilizers appear to increase the stiffness of the whip.

Instead of potassium acid tartrate, we use about 1% tetrasodium pyrophosphate, as well as tartaric acid and citric acid in amount of about .5%. About 0.02% to 1% of these stiffening and flavor-imparting ingredients are used, the amount being such that it will not bring the pH below 5.0 of the liquid mix. These ingredients are optional.

Vanilla or other desired flavor is sometimes added to the liquid mix before pasteurization. Also, food colors, if desired, are added to the liquid mix before pasteurization, such as edible colors to give a yellowish or cream color, e.g. beta carotene.

The liquid mix to which all the ingredients are added before pasteurization has a range of 40 to 60% solids content. Sweet skim milk may be used instead of water but is not preferred.

Pasteurization of the liquid mix should not be at so high a temperature or for too long as to denature the casein or protein. A temperature of about 140° F. to 165° F. for 30 to 25 minutes is adequate depending on the temperatures.

Homogenization is carried out at low pressures and at about the pasteurization temperature, e.g., 100 to 800 p.s.i. and preferably at about 500 to 600 p.s.i.

The spray-drying is carried out in commercial apparatus having as large an orifice as possible to give a large particle size powder of about 75 to 200 microns, preferably 125 to 150 microns.

In using the products of this invention, about one-half cup of milk or water is placed in a "Mixmaster" or other mixing machine bowl and about 57 grams (2 ounces) of the powder are stirred slowly into the liquid in the bowl until thoroughly mixed. Then the mixing device is operated at high speed until the desired whipped body is reached, usually in 2 to 4 minutes. A hand whipping device may be used, if desired.

The mixture need not be kept refrigerated, but after the powder is recombined with water or milk, the product may be allowed to stand and will immediately whip up without prior refrigeration.

In combining the powder with water to make a whippable mix, we used from about 60% to 85% water with about 15% to 40% powder, preferably 25% powder and 75% water.

With sweet milk we use from about 70% to 85% milk with about 15% to 30% powder, preferably about 80% sweet milk and 20% powder.

With skim milk we use from about 60% to 85% skim milk with about 15% to 40% powder, preferably about 80% skim milk and 20% powder.

*Powdered Shortening*

EXAMPLE A

We also prepare a shortening in powdered form by mixing about 80 parts by weight of the glycerol lacto monopalmitate and about 20 parts by weight of the standard mono- and di-glycerides mentioned above. About 73 parts by weight of hydrogenated cottonseed oil is mixed with about 1% of the aforesaid mixture based on the weight of the oil and there is also added about 27% skim milk by weight. The mixture comprises about 73% fat, 27% skim milk, about 10% of the palmitate and about 2% of the mono- and di-glycerides.

EXAMPLE B

Another composition includes in addition about 6% cane sugar and the skim milk was reduced to 21%.

These mixtures were respectively pasteurized at 145° F. for 30 minutes and homogenized at the pasteurizing temperature at 1500 p.s.i., whereupon the pasteurized homogenized mixture is spray-dried to form a powdered shortening in which the fat particles are coated with a skin of milk solids not fat and the palmitate and sugar where the latter is used.

In addition to the ingredients recited in the foregoing examples, an emulsifying agent is sometimes added, such as gum acacia, in a small amount of about 0.2%.

Usually the hydrogenated oil is employed in amount of about 70 to 75% and any of the usual edible shortening oils are used, such as hydrogenated cottonseed oil, corn oil, cocoanut oil, peanut oil etc.

The skim milk is used in amount of 20 to 27% by weight.

Propylene glycol monostearate or glycerol lacto oleate may be used instead of the palmitate and these compounds are used in amount of about 1 to 10% based on the weight of the oil.

Mono- and di-glycerides are used in amount of about 0.5% to 2% based on the weight of the oil.

Emulsifiers such as gum acacia, gum tragacanth, sodium caseinate, soy protein, etc., are used in small amount of about 0.01% to 0.1%.

Up to 6% cane sugar, beet sugar, or other form of sucrose is used according to the sweetness desired.

EXAMPLE 2a

This example is prepared like Example 1 and includes the following:

| | Preferred, by dry wt., percent | Permissible range, percent |
|---|---|---|
| High Ratio Shortening Fat "Sweetex" | 70 | 65 to 75 |
| Sodium Caseinate | 9 | 5 to 15 |
| Cane Sugar | 20 | 10 to 30 |
| Salt | 0.3 | 0.1 to 0.6 |
| Sodium Alginate (Daraloid XL) | 0.07 | 0.02 to 0.5 |
| Propylene Glycol Monostearate (self-emulsifying type) | 0.6 | 0.2 to 2 |

Further preferred dry compositions prepared as described in this application are as follows:

EXAMPLE 7

| | Permissible range, percent | Preferred, percent |
|---|---|---|
| Hydrogenated cotton seed oil | 40 to 65 | 49 |
| Modified lecithin ("Centrolphil IP or IM" which is the fraction strongly giving a water in oil type emulsion) | 0.0 to 3.00 | 1.00 |
| Sodium Caseinate | 5-15 | 10 |
| Cane Sugar | 5-35 | 30 |
| Propylene Glycol monostearate of the type which is slightly saponified and self-emulsifying sold under its trademark Mono-D. | 1-15 | 10 |

EXAMPLE 8

To 57 grams of Example 7 we added about .25 gram (.44% on a dry basis) of calcium lactate.

EXAMPLE 9

To 57 grams of Example 7 we added about 1 gram (1.75% on a dry basis) of mono-calcium phosphate.

EXAMPLE 10

To Example 7 we added the same amounts of the ingredients as described in Examples 8 and 9, namely, to 57 grams of Example 7 we added 1.25 grams of the mixture of calcium lactate and mono-calcium phosphate, making a total of 58.25 grams.

EXAMPLES 11, 8a, 9a, 10a

To Example 7 we added .1 gram sodium alginate and we likewise did the same in Examples 8, 9, and 10, respectively.

The foregoing examples give a permanence and stiffness or set which is very desirable. The additional ingredients are useful with the methods and products described in this application and the other examples.

The calcium lactate may vary between about .25% and 1%; the mono-calcium phosphate may vary between about .5% and 3%; and the sodium alginate may vary between about .02% and 0.5%.

The range of ingredients in Example 7 and the examples following the same may vary as set forth in the permissible range.

This application is a continuation-in-part of application Serial No. 825,403, filed July 7, 1959, abandoned, which is a continuation-in-part of application Serial No. 556,062, filed December 29, 1955.

We claim:

1. A whipping composition in the form of a water soluble dry powder containing edible fat about 40 to 60%, mono- and di-glycerides in amount of about 0.0 to 10%, a whipping agent selected from the group consisting of glycerol lacto monopalmitate, and glycerol lacto oleate in amount of about 0.5 to 15%, sweetener in amount of 5 to 35%, and protein about 1 to 15%, all amounts being by weight of the finished powder.

2. A composition according to claim 1 including lecithin in amount of about .25 to 1.5%.

3. A composition according to claim 1 including about 0.02 to 1% of a stabilizer and stiffening agent.

4. A composition according to claim 1 including about 0.02 to 1% of a stiffening and flavor imparting agent.

5. The composition according to claim 1 recombined in water and ready for whipping.

6. The composition according to claim 1 recombined in milk and ready for whipping.

7. A process of making a whippable product comprising mixture an edible oil, mono- and di-glycerides, a whipping agent selected from the group consisting of glycerol lacto monopalmitate and glycerol lacto oleate, sweetener and protein, with a member of the group consisting of water and milk to form a mixture containing from 40 to 60% solids, pasteurizing, homogenizing and drying to a powder having a micron size between about 75 and 200 microns.

8. A process according to claim 7 wherein a stabilizing and stiffening agent in an amount of 0.02 to 1.0% is included in the mixture before pasteurizing.

9. A process according to claim 7 wherein a stiffening and flavor-imparting agent in an amount of 0.02 to 1.0% is included in the mixture before pasteurizing.

10. A process according to claim 7 wherein the time and temperature of pasteurization is insufficient to denature the protein.

11. A process according to claim 7 wherein the homogenization is at a pressure between about 300 and 800 p.s.i.

12. A process according to claim 7 wherein the powder is recombined with 60 to 85% of a member of the group consisting of water and milk and the mixture whipped.

13. A powdered shortening containing edible fat encased in a compound selected from a group consisting of glycerol lacto monopalmitate, and glycerol lacto oleate, mono- and di-glycerides, and milk solids not fat.

14. A powdered shortening containing edible fat encased in a compound selected from a group consisting of glycerol lacto monopalmitate, glycerol lacto oleate, mono- and di-glycerides, sugar, and milk solids not fat.

15. A process of preparing a powdered shortening comprising preparing a mixture of edible fat, a compound selected from the group consisting of glycerol lacto monopalmitate, and glycerol lacto oleate, mono- and di-glycerides, and milk solids not fat, pasteurizing the same, homogenizing the pasteurized mixture, and spray-drying the pasteurized homogenized mixture to form a powdered shortening wherein the fat particles are coated with the other ingredients.

16. A whipping composition in the form of a dry powder containing an edible fat, a compound selected from the group consisting of glycerol lacto monopalmitate, and glycerol lacto oleate, the particles being encased in a protein, and a carbohydrate.

17. A whipping composition according to claim 16 containing sodium alginate.

18. A whipping composition according to claim 16 containing calcium lactate.

19. A whipping composition according to claim 16 containing a compound selected from the group consisting of mono calcium phosphate, tetrasodium phosphate, tartaric acid, potassium acid tartrate and citric acid.

20. A whipping composition according to claim 18, containing sodium alginate.

21. A whipping composition according to claim 16 containing lecithin.

22. A whipping composition as set forth in claim 1 in which said whipping agent is glycerol lacto monopalmitate.

23. A whipping composition as set forth in claim 1 in which said whipping agent is glycerol lacto oleate.

24. A process according to claim 7 wherein the whipping agent is glycerol lacto monopalmitate.

References Cited in the file of this patent

UNITED STATES PATENTS

| | | |
|---|---|---|
| 2,271,654 | Littlefield | Feb. 3, 1942 |
| 2,509,414 | Barsky | May 30, 1950 |
| 2,588,419 | Sevall et al. | Mar. 11, 1952 |
| 2,619,423 | Diamond | Nov. 25, 1952 |
| 2,690,971 | Iveson et al. | Oct. 5, 1954 |
| 2,913,342 | Cameron et al. | Nov. 17, 1959 |
| 2,957,932 | Radlove et al. | Oct. 25, 1960 |

FOREIGN PATENTS

| | | |
|---|---|---|
| 607,810 | Great Britain | Sept. 6, 1948 |

UNITED STATES PATENT OFFICE
CERTIFICATE OF CORRECTION

Patent No. 3,098,748                      July 23, 1963

Peter P. Noznick et al.

It is hereby certified that error appears in the above numbered patent requiring correction and that the said Letters Patent should read as corrected below.

Column 4, line 56, column 5, line 21, and column 6, lines 2 and 3, after "monopalmitate", each occurrence, strike out the comma; column 4, line 71, for "mixture" read -- mixing --; column 5, line 25, for "monopalmitate," read -- monopalmitate and --.

Signed and sealed this 28th day of April 1964.

(SEAL)
Attest:

ERNEST W. SWIDER                      EDWARD J. BRENNER

Attesting Officer                      Commissioner of Patents

Disclaimer 3,098,748.—*Peter P. Noznick*, and *Charles W. Tatter*, Chicago, Ill. WHIPPING AND POWERED SHORTENING COMPOSITIONS. Patent dated July 23, 1963. Disclaimer filed Aug. 2, 1968, by the assignee, *Beatrice Foods Co.*

Hereby enters this disclaimer to claims 13, 14 and 15 of said patent.

[*Official Gazette January 7, 1969.*]